United States Patent
Igeta et al.

(10) Patent No.: US 7,692,745 B2
(45) Date of Patent: Apr. 6, 2010

(54) TRANSFLECTIVE LIQUID CRYSTAL DISPLAY DEVICE HAVING PARTICULAR PIXEL ELECTRODES AND COUNTER ELECTRODES ARRANGEMENT

(75) Inventors: Koichi Igeta, Chiba (JP); Junji Tanno, Chiba (JP)

(73) Assignee: Hitachi Displays, Ltd., Chiba-ken (JP)

(*) Notice: Subject to any disclaimer, the term of this patent is extended or adjusted under 35 U.S.C. 154(b) by 307 days.

(21) Appl. No.: 12/010,495

(22) Filed: Jan. 25, 2008

(65) Prior Publication Data

US 2008/0180616 A1 Jul. 31, 2008

(30) Foreign Application Priority Data

Jan. 26, 2007 (JP) ............................ 2007-016692

(51) Int. Cl.
G02F 1/1335 (2006.01)
G02F 1/1343 (2006.01)
G02F 1/136 (2006.01)

(52) U.S. Cl. .................... 349/114; 349/141; 349/43; 349/117

(58) Field of Classification Search ............... 349/114, 349/141, 43, 117
See application file for complete search history.

(56) References Cited

U.S. PATENT DOCUMENTS 6,914,656 B2   7/2005   Sakamoto et al.
7,088,409 B2 * 8/2006   Itou et al. .................... 349/114
7,535,530 B2 * 5/2009   Teramoto et al. ............ 349/117
7,599,027 B2 * 10/2009  Igeta et al. ................... 349/114

FOREIGN PATENT DOCUMENTS

JP   2003-344837   5/2002
JP   2005-338256   5/2004
JP   2007-139934   11/2005

* cited by examiner

Primary Examiner—Mike Qi
(74) Attorney, Agent, or Firm—Stites & Harbison, PLLC; Juan Carlos A. Marquez, Esq

(57) ABSTRACT

The present invention enhances display quality of an IPS-type transflective liquid crystal display device. In the transflective liquid crystal display device including a liquid crystal display panel having a pair of substrates and a liquid crystal layer sandwiched between the pair of substrates, the liquid crystal display panel including a plurality of sub pixels each of which has a transmissive portion and a reflective portion, each sub-pixel out of the plurality of subpixels having a counter electrode formed on one substrate out of the pair of substrates and a pixel electrode formed on one substrate, the counter electrode and the pixel electrode generating an electric field for driving liquid crystal of the liquid crystal layer, the counter electrode and the pixel electrode in the reflective portion are stacked by way of an insulation film, and the counter electrode and the pixel electrode in the transmissive portion face each other in a planer direction.

13 Claims, 14 Drawing Sheets

TRANSFLECTIVE LIQUID CRYSTAL DISPLAY DEVICE HAVING PARTICULAR PIXEL ELECTRODES AND COUNTER ELECTRODES ARRANGEMENT

The present application claims priority from Japanese application JP2007-16692 filed on Jan. 26, 2007, the content of which is hereby incorporated by reference into this application.

BACKGROUND OF THE INVENTION

The present invention relates to a transflective liquid crystal display device, and more particularly to a technique which is effectively applicable to an IPS (In Plane Switching)-type transflective liquid crystal display device.

A transflective liquid crystal display device which includes a transmissive portion and a reflective portion within one sub pixel has been used as a display of a portable equipment.

On the other hand, as a liquid crystal display device, there has been known an IPS-type liquid crystal display device. This IPS-type liquid crystal display device forms pixel electrodes (PIX) and counter electrodes (COM) on the same substrate and controls contrast by rotating liquid crystal in a plane of the substrate by applying an electric field between the pixel electrodes (PIX) and the counter electrodes (COM) Accordingly, this IPS-type liquid crystal display device possesses a feature that when a viewer observes a screen from an oblique position, intensity or contrast of a display image is not inverted. To effectively make use of such a feature, for example, patent document 1 (JP-A-2003-344837), patent document 2 (JP-A-2005-338256), patent document 3 (Japanese Patent Application 2005-331227) and the like propose transflective liquid crystal display devices which are formed using the IPS-type liquid crystal display device.

As a method for forming the transflective liquid crystal display device using the IPS-type liquid crystal display device, in patent document 1, a half-wave plate is formed on a transmissive region and a reflective region, the transmissive region is driven by a lateral electric field, and the reflective region is driven by a vertical electric field. On the other hand, in patent document 2, a half-wave plate is formed only on a reflective region, and both of a transmissive region and the reflective region are driven by a lateral electric field.

SUMMARY OF THE INVENTION

In general, a transflective liquid crystal display panel includes a transmissive portion and a reflective portion within one subpixel (within the same pixel). The transmissive portion enables a transmissive display by allowing light generated from a light source arranged on a side opposite to a viewing screen to pass therethrough toward a viewing screen side, and the reflective portion enables a reflective display by allowing an external light incident from a viewing screen side to be reflected in the inside of the liquid crystal panel or on a reflective plate arranged outside the liquid crystal panel and to be radiated to the viewing screen side again. As a result, the transflective liquid crystal display device can perform both of the transmissive display and the reflective display.

An IPS-type transflective liquid crystal display panel also has the substantially same structure. A transmissive portion is constituted by combining at least a pair of polarizers arranged outside a liquid crystal layer and liquid crystal, and controls a transmitting quantity of light by changing the phase difference of the liquid crystal layer with an electric field. The retardation ($\Delta n \cdot d$; product of refractive index anisotropy of liquid crystal and thickness of liquid crystal layer) of the liquid crystal layer is, in general, set to approximately 280 nm (200 to 400 nm) corresponding to the retardation of a half-wave plate. Further, a phase difference plate may be provided between the polarizer and the liquid crystal.

On the other hand, a reflective portion is constituted by combining at least a polarizer which is arranged on a viewing screen side outside the liquid crystal layer and a phase difference plate and liquid crystal which are arranged between the polarizer and a reflective plate. Although the arrangement order of the phase difference plate and the liquid crystal may be arbitrarily set, in general, the retardation of the liquid crystal layer close to the polarizer side is set to approximately 280 nm corresponding to the retardation of the half-wave plate, and the retardation of the liquid crystal layer close to the reflective plate is set to approximately 140 nm corresponding to the retardation of a quarter-wave plate.

In the transflective liquid crystal display panel, to set an optical path length of the transmissive portion and an optical path length of the reflective portion substantially equal to each other, in general, a liquid crystal layer thickness of the reflective portion is set to approximately half of a liquid crystal layer thickness of the transmissive portion. This is because the transmissive portion allows the light to pass through the liquid crystal layer only once, while the reflective portion allows the light to pass through the liquid crystal layer along outgoing and incoming paths thereof (the optical path length of the reflective portion becoming approximately twice as large as the liquid crystal layer thickness). Accordingly, the reflective portion is required to adjust the liquid crystal layer thickness by forming a step forming layer. A B-type transflective liquid crystal display panel described later also forms a step forming layer in a reflective portion in the same manner.

The IPS-type transflective liquid crystal display device is roughly classified into two types of transflective liquid crystal display devices. One type of transflective liquid crystal display device adopts the structure in which both of a pixel electrode and a counter electrode are formed in a comb-teeth shape and the pixel electrode and the counter electrode are alternately arranged (hereinafter referred to as type A). Here, the pixel electrodes and the counter electrodes may be formed on the same layer or may be formed on different layers by way of an interlayer insulation film. Another type of transflective liquid crystal display device adopts the structure in which a counter electrode is formed on a whole pixel region of a substrate, and comb-teeth-shaped pixel electrodes are arranged on the counter electrode by way of an interlayer insulation film (hereinafter referred to as type B). The latter type B has a feature that a drive voltage of liquid crystal is hardly changed corresponding to a change of the liquid crystal layer thickness and hence, when the IPS-type is applied to the transflective liquid crystal display panel which requires the stepped structure, it is desirable to adopt the type B.

However, the type B adopts the structure which sandwiches the interlayer insulation film between the pixel electrodes and the counter electrode and hence, when the liquid crystal is driven for a long time, there arises a drawback that a charge is stored in the interlayer insulation film. An electric field generated by the stored charge influences liquid crystal molecules and hence, an electric field which the liquid crystal molecules receive becomes stronger or weaker than a desired electric field, and such a phenomenon appears as a change of transmissivity or reflectance. This change is referred to as image retention or sticking, in general, and is a display defect which should never occur in the liquid crystal display. That is, the change causes the deterioration of display quality.

Although such a drawback may arise irrespective of whether the interlayer insulation film is an organic insulation film or an inorganic insulation film, this drawback becomes particularly more conspicuous when the interlayer insulation film is formed of the organic insulation film.

The present invention has been made to overcome the above-mentioned drawback of the related art, and it is an object of the present invention to provide a technique which can enhance display quality in an IPS-type transflective liquid crystal display device.

The above-mentioned and objects and novel features of the present invention will become apparent from the description of the specification and attached drawings.

To briefly explain the summary of typical inventions among inventions disclosed in this specification, they are as follows.

The higher a contrast ratio of display, more easily the image retention is liable to be observed and hence, in a transflective liquid crystal panel, the image retention is observed in a transmissive portion and the image retention is not observed in a reflective portion. This is because, in general, the transmissive portion exhibits the high contrast ratio of 200:1 or more, while the reflective portion exhibits a low contrast ratio of 50:1 or less. Accordingly, it is sufficient for the transflective liquid crystal display panel to cope with the image retention of only the transmissive portion. The transflective liquid crystal display device of the present invention has following constitutions, for example.

(1) In a transflective liquid crystal display device including a liquid crystal display panel having a pair of substrates and a liquid crystal layer sandwiched between the pair of substrates, the liquid crystal display panel including a plurality of sub pixels each of which has a transmissive portion and a reflective portion, each sub pixel out of the plurality of sub pixels having a counter electrode formed on one substrate out of the pair of substrates and a pixel electrode formed on one substrate, the counter electrode and the pixel electrode generating an electric field for driving liquid crystal of the liquid crystal layer, the counter electrode and the pixel electrode in the reflective portion are stacked by way of an insulation film, and the counter electrode and the pixel electrode in the transmissive portion face each other in the planer direction.

(2) In the above-mentioned constitution (1), the counter electrode and the pixel electrode in the transmissive portion are formed on the same layer.

(3) In the above-mentioned constitution (1) or (2), the insulation film is not provided to the transmissive portion.

(4) In any one of the above-mentioned constitutions (1) to (3), the counter electrode in the reflective portion is formed of a plane electrode, and the counter electrode in the transmissive portion is formed of an electrode having a plurality of linear portions, the pixel electrode in the reflective portion and the pixel electrode in the transmissive portion are formed of an electrode having a plurality of linear portions, and the pixel electrode in the reflective portion is formed above the counter electrode in the reflective portion.

(5) In the above-mentioned constitution (4), a reflective electrode is formed over the counter electrode in the reflective portion.

(6) In any one of the above-mentioned constitutions (1) to (3), the pixel electrode in the reflective portion is formed of a plane electrode, the pixel electrode in the transmissive portion is formed of an electrode having a plurality of linear portions, the counter electrode in the reflective portion and the counter electrode in the transmissive portion are formed of an electrode having a plurality of linear portions, and the counter electrode in the reflective portion is formed above the pixel electrode in the reflective portion.

(7) In the above-mentioned constitution (6), a reflective electrode is formed over the pixel electrode in the reflective portion.

(8) In the above-mentioned constitution (4) or (6), the linear portions of the pixel electrode and the linear portions of the counter electrode in the transmissive portion are alternately arranged close to each other.

(9) In any one of the above-mentioned constitutions (1) to (8), a phase difference plate and a step forming layer are formed on the reflective portion of another substrate out of the pair of substrates.

(10) In any one of the above-mentioned constitutions (1) to (8), a phase difference plate is formed and a step forming layer is not formed on the reflective portion of another substrate out of the pair of substrates.

(11) In any one of the above-mentioned constitutions (1) to (10), the insulation film is an organic insulation film.

(12) In any one of the above-mentioned constitutions (1) to (10), the insulation film is an inorganic insulation film.

To briefly explain advantageous effects obtained by typical inventions among inventions disclosed in this specification, they are as follows.

According to the present invention, in an IPS-type transflective liquid crystal display device, it is possible to enhance display quality.

DESCRIPTION OF THE PREFERRED EMBODIMENTS

Hereinafter, embodiments of the present invention are explained in detail in conjunction with the drawings. Here, in all drawings for explaining the embodiments of the present invention, parts having equal functions are given the same symbols and their repeated explanation is omitted.

Embodiment 1

Figure 1:
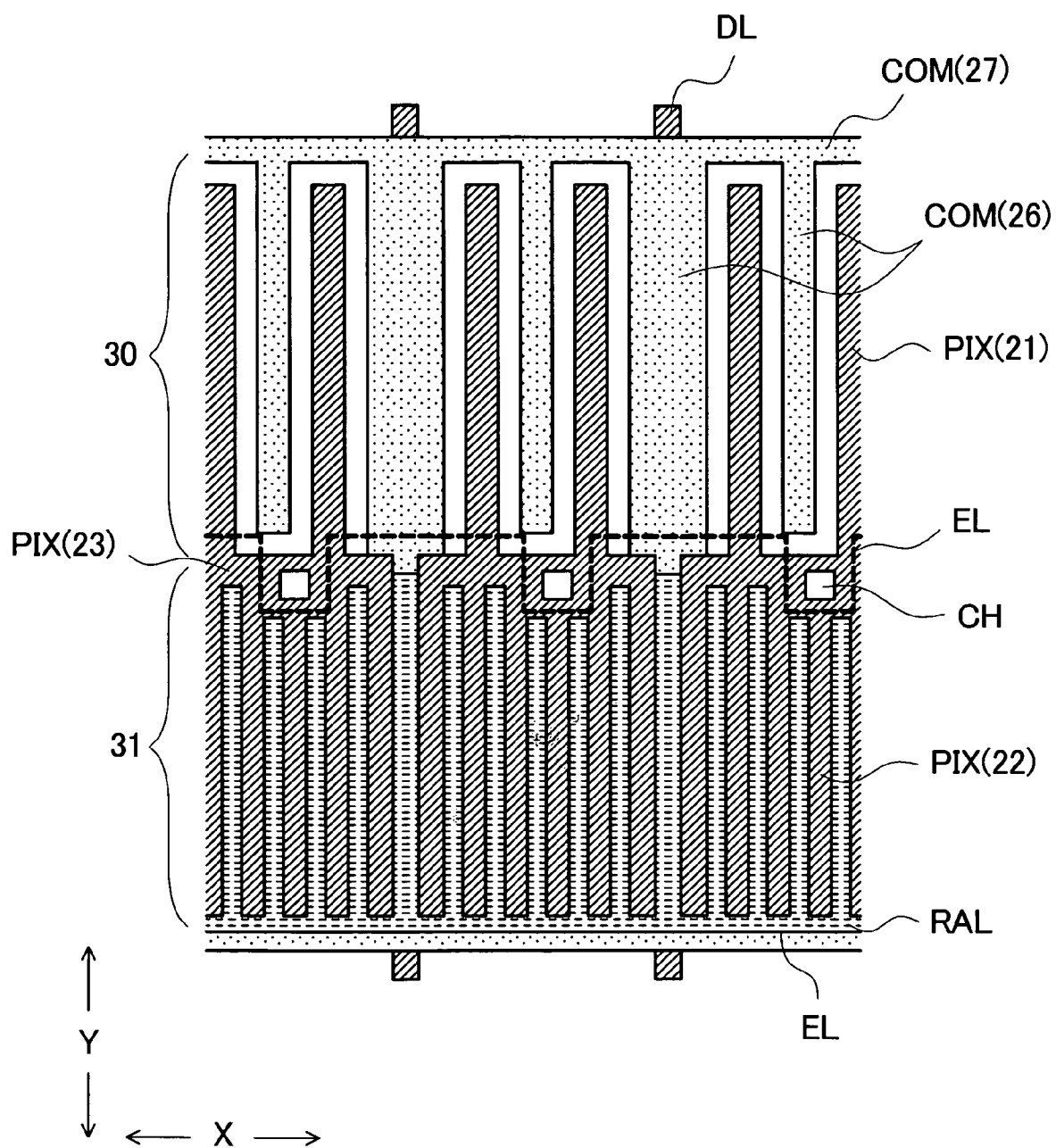
FIG. 1 is a plan view showing the electrode structure of one sub pixel and portions of two sub pixels adjacent to one sub pixel on a TFT substrate side in a transflective liquid crystal display device which constitutes an embodiment 1 according to the present invention.
Figure 2:
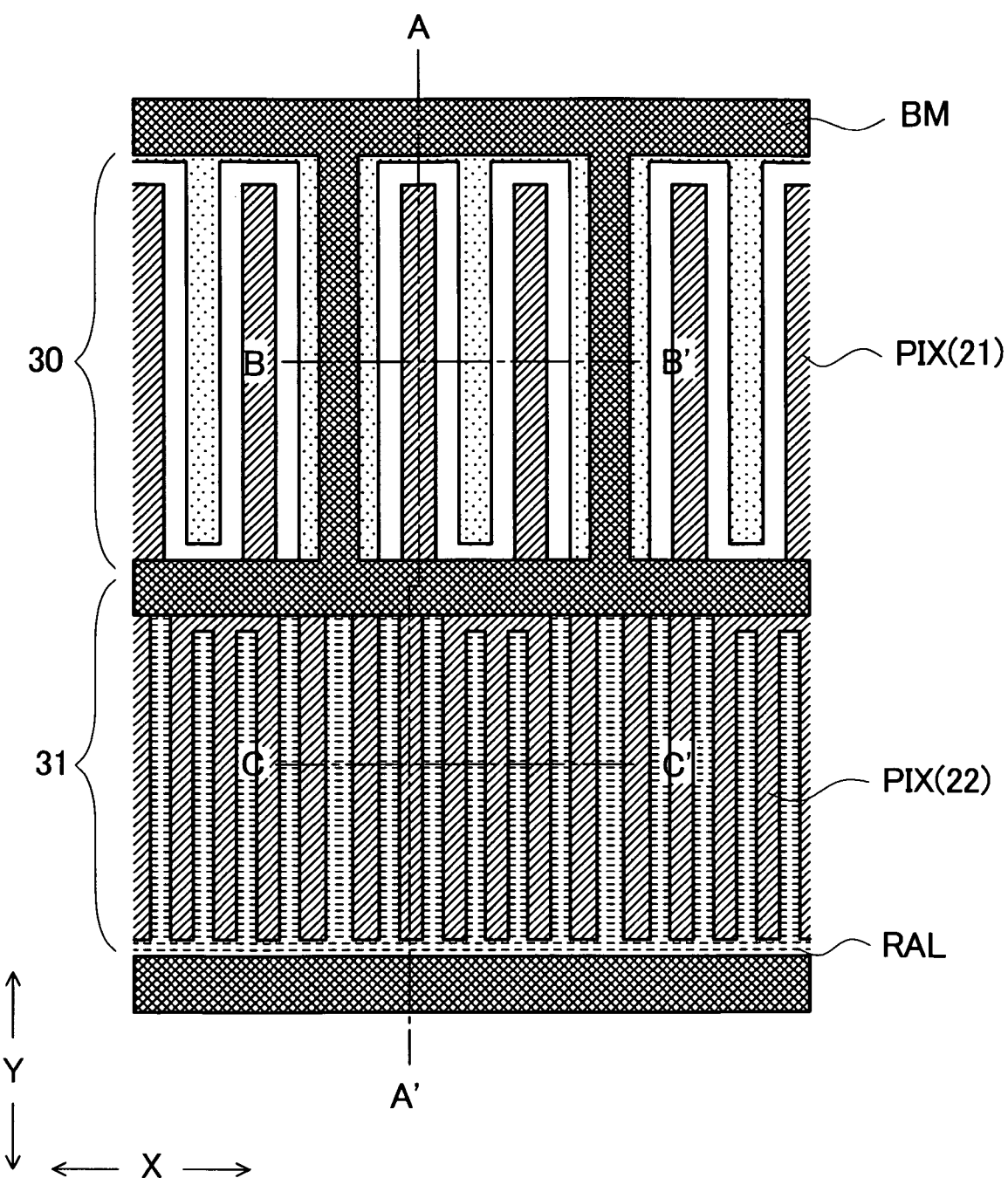
FIG. 2 is a plan view showing a state that a CF substrate overlaps with the TFT substrate shown in FIG. 1.
Figure 3:
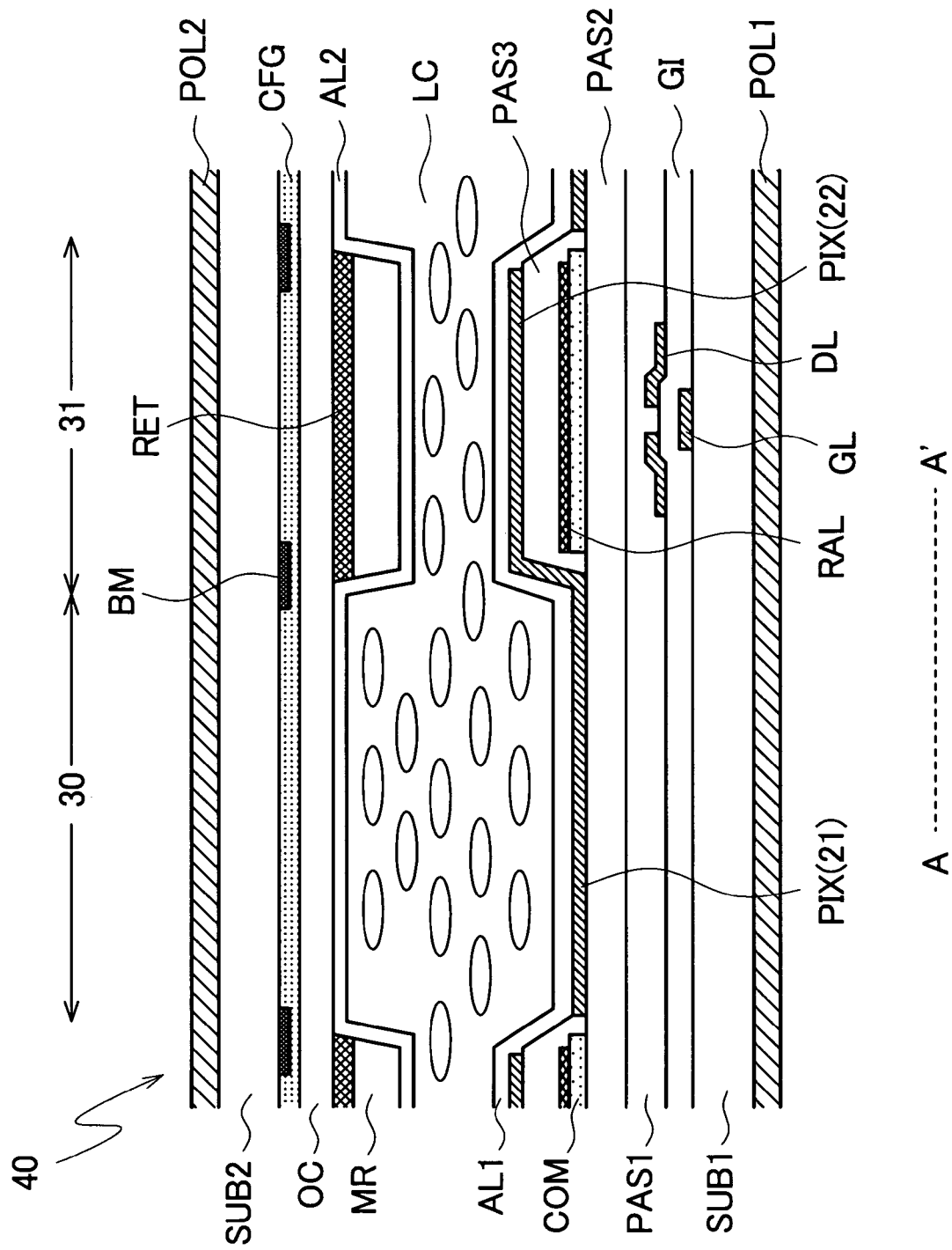
FIG. 3 is a cross-sectional view showing the cross-sectional structure taken along a line A-A' in FIG. 2.
Figure 4:
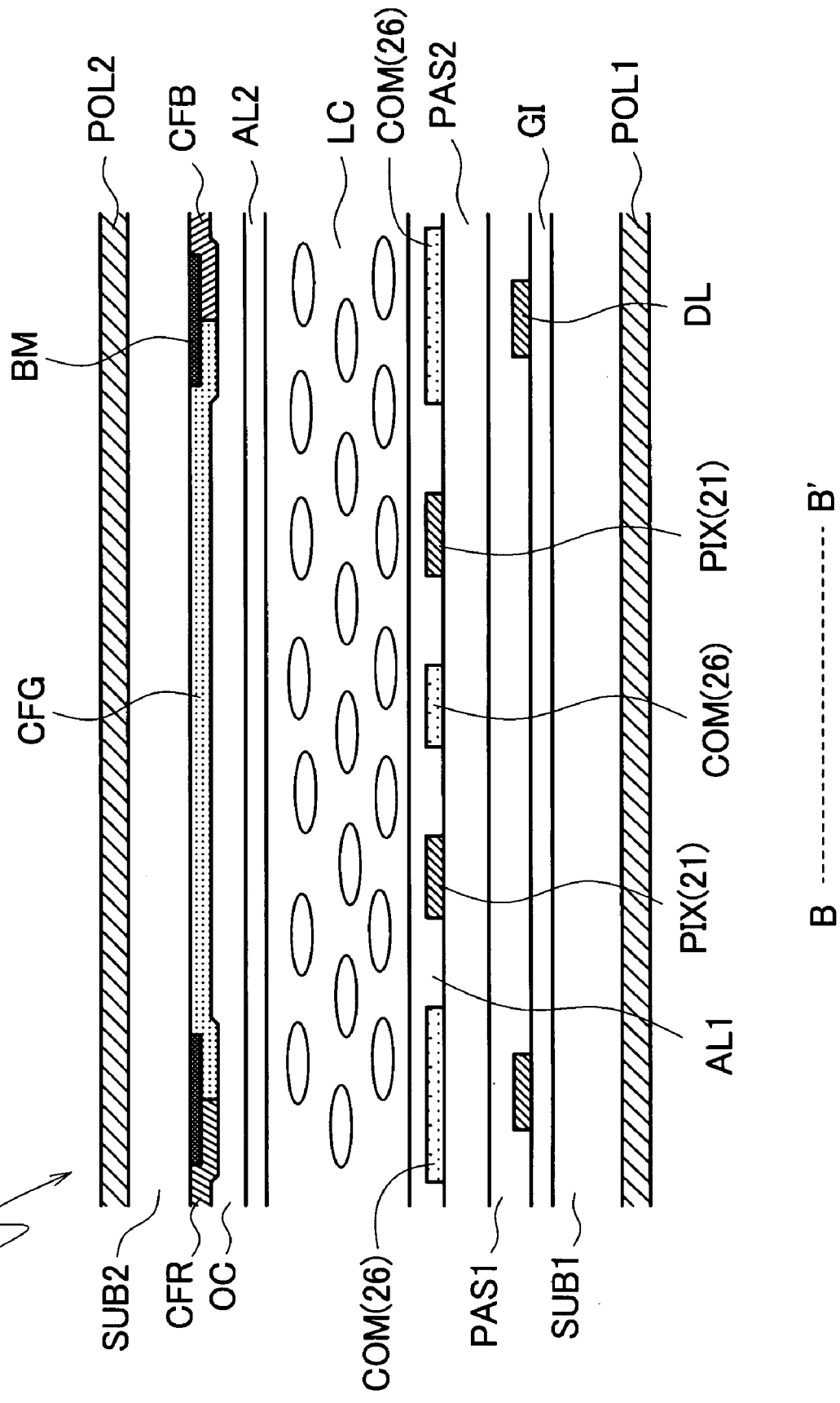
FIG. 4 is a cross-sectional view showing the cross-sectional structure taken along a line B-B' in FIG. 2.
Figure 5:
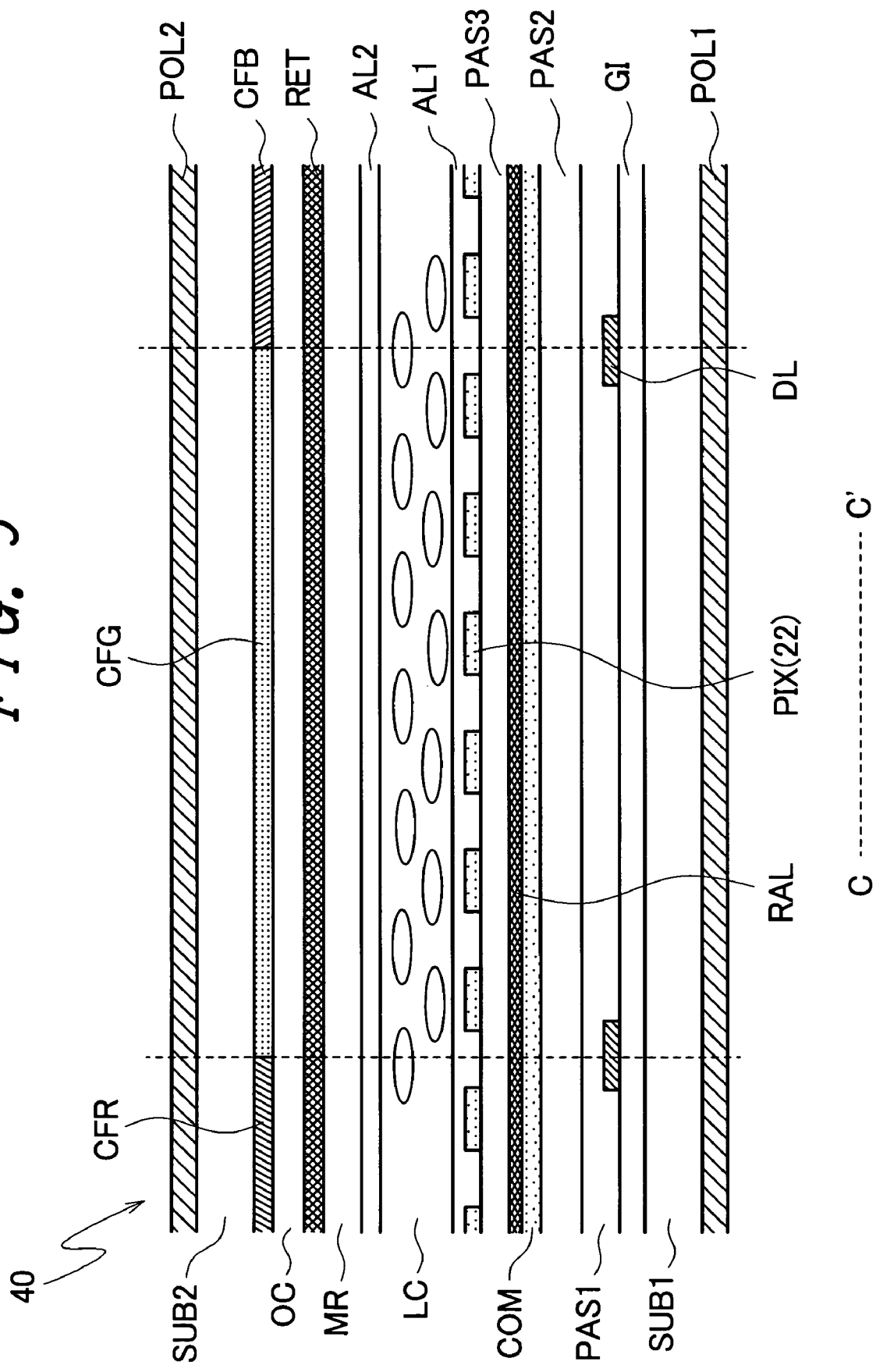
FIG. 5 is a cross-sectional view showing the cross-sectional structure taken along a line C-C' in FIG. 2.
Figure 6:
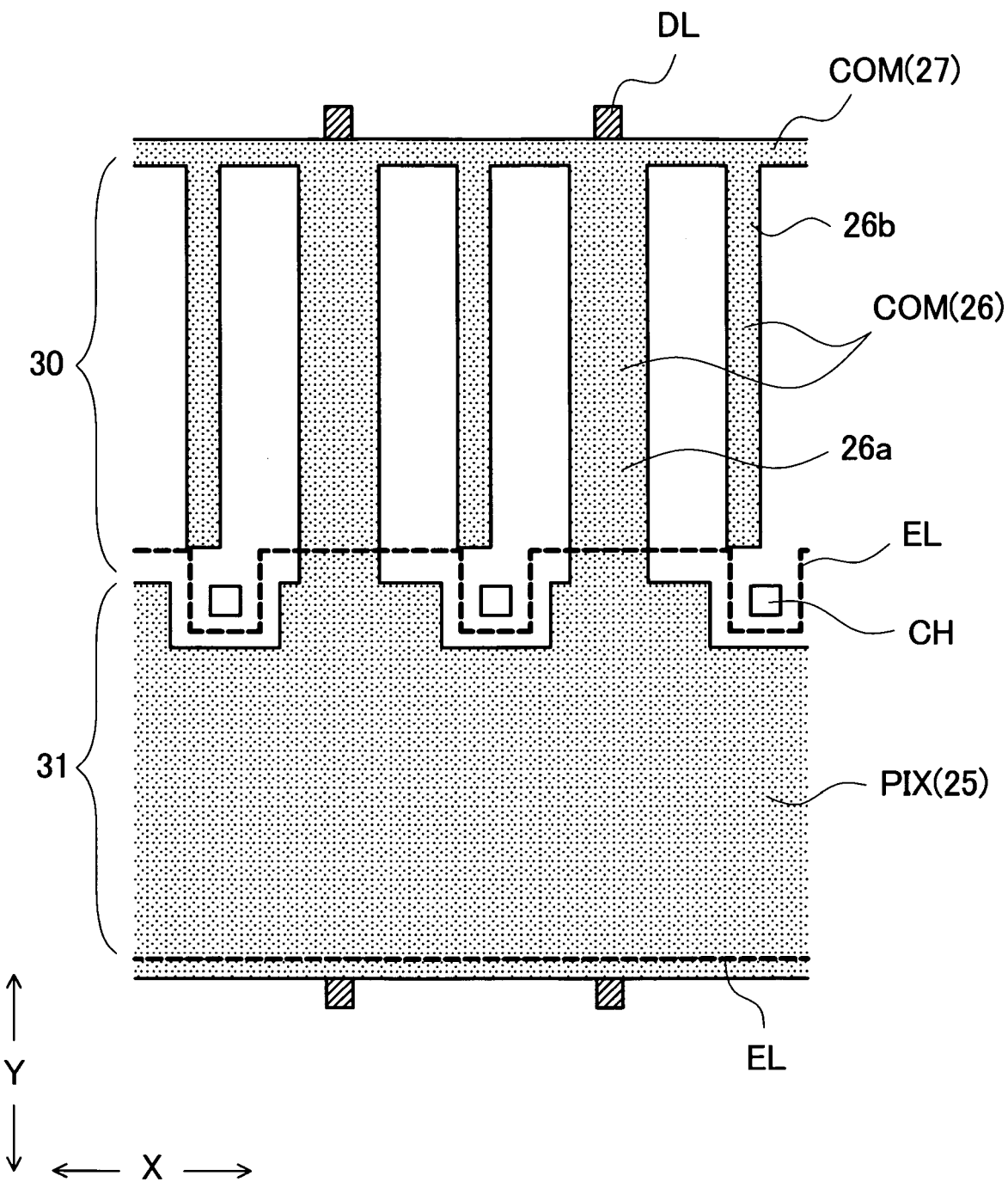
FIG. 6 is a plan view showing the relationship between a counter electrode and an insulation film of the embodiment 1.

FIG. 1 is a plan view showing the electrode structure of one sub pixel and portions of two sub pixels adjacent to one subpixel on a TFT substrate side in an IPS-type transflective liquid crystal display device which constitutes an embodiment 1 according to the present invention, FIG. 2 is a plan view showing a state that a CF substrate overlaps with the TFT substrate shown in FIG. 1, FIG. 3 is a cross-sectional view showing the cross-sectional structure taken along a line A-A' in FIG. 2, FIG. 4 is a cross-sectional view showing the cross-sectional structure taken along a line B-B' in FIG. 2, FIG. 5 is a cross-sectional view showing the cross-sectional structure taken along a line C-C' in FIG. 2, and FIG. 6 is a plan view showing the relationship between a counter electrode (COM) and an insulation film (PAS3) of the embodiment 1 according to the present invention.

In FIG. 2, numeral 30 indicates a transmissive portion which constitutes a transmissive liquid crystal display panel, and numeral 31 indicates a reflective portion which constitutes a reflective liquid crystal display panel. Further, FIG. 3 shows the cross-sectional structure of the transmissive portion 30 and the reflective portion 31, FIG. 4 shows the cross-sectional structure of the transmissive portion 30, and FIG. 5 shows the cross-sectional structure of the reflective portion 31.

The IPS-type transflective liquid crystal display device of this embodiment 1 includes a liquid crystal display panel 40 (see FIG. 3 to FIG. 5). The liquid crystal display panel 40 is, as shown in FIG. 3 to FIG. 5, configured such that a liquid crystal layer (LC) formed of a large number of liquid crystal molecules is sandwiched between a pair of glass substrates (SUB1, SUB2), and a main surface side of the glass substrate (SUB2) constitutes a viewing side. Further, the liquid crystal display panel 40 includes a plurality of sub pixels each having the transmissive portion 30 and the reflective portion 31. Each of the plurality of sub pixels includes a pixel electrode (PIX) and a counter electrode (COM; also referred to as a common electrode). Further, the liquid crystal display panel 40, as viewed in a plan view, includes scanning lines (GL) which extend along the X direction and video lines (DL) which extend along the Y direction orthogonal to the X direction in the same plane. The plurality of scanning lines (GL) is arranged in parallel to each other in the Y direction at a predetermined interval, while the plurality of video lines (DL) is arranged in parallel to each other in the X direction at a predetermined interval.

Here, the plurality of sub pixels is arranged in a matrix array in the X direction as well as in the Y direction, and the plurality of sub pixels arranged along the X direction constitutes one display line, and a plurality of display lines is formed in the Y direction.

As shown in FIG. 3 to FIG. 5, on a liquid-crystal-layer side of the glass substrate (SUB2; CF substrate, also referred to as a color filter substrate), in order from the glass substrate (SUB2) to the liquid crystal layer (LC), a light blocking film (BM), color filters of red, green, blue (CFR, CFG, CFB), a protective film (OC), a phase difference plate (phase difference layer) which changes a polarization state of light (half-wave plate) (RET), a step forming layer (MR), and an orientation film (AL2) are formed. A polarizer (POL2) is arranged on an outer side of the glass substrate (SUB2) opposite to the liquid-crystal-layer side of the glass substrate (SUB2).

On a liquid-crystal-layer side of the glass substrate (SUB1; also referred to as a TFT substrate), in order from the glass substrate (SUB1) to the liquid crystal layer (LC), the scanning lines (GL; also referred to as the gate lines), a gate insulation film (G1), the video lines (DL; also referred to as source lines or drain lines), an insulation film (PAS1), an insulation film (PAS2), counter electrodes (COM; also referred to as common electrodes) and reflective electrodes (RAL), an insulation film (PAS3), pixel electrodes (PIX) and an orientation film (AL1) are formed. A polarizer (POL1) is arranged on an outer side of the glass substrate (SUB1) opposite to the liquid-crystal-layer side of the glass substrate (SUB2).

On the counter electrode (COM) of the reflective portion 31, the reflective electrode (RAL) is formed. The reflective electrode (RAL) may be formed of a metal film made of aluminum (Al) or may have the two-layered structure formed of a lower layer made of molybdenum (Mo) and an upper layer made of aluminum (Al), for example.

The phase difference plate (RET) and the step forming layer (MR) are formed corresponding to the reflective portion 31. The step forming layer (MR) is provided for adjusting a cell gap length (d) of the liquid crystal layer (LC) in the reflective portion 31 to allow an optical path length of light in the reflective portion (31) to assume an optical path length corresponding to a λ/4 wave plate. The phase difference plate (RET) is provided for preventing the inversion of contrast between the transmissive portion 30 and the reflective portion 31 and is constituted of a half-wave plate in this embodiment 1, for example.

The pixel electrode (PIX) is, as shown in FIG. 1 and FIG. 2, configured to include a connecting portion 23 which is arranged in a boundary portion between the transmissive portion 30 and the reflective portion 31, a plurality of linear portions 21 which is arranged in the transmissive portion 30 and has respective one end sides thereof contiguously formed with the connecting portions 23, and a plurality of linear portions 22 which is arranged in the reflective portion 31 and has respective one end sides thereof contiguously formed with the connecting portion 23. The connecting portion 23 extends along the extending direction (X direction) of the scanning lines (GL). The plurality of linear portions 21 are pulled out to a transmissive-portion-30 side along the extending direction (Y direction) of the video lines (DL) from the connecting portion 23 and, at the same time, are arranged at a predetermined interval along the extending direction of the scanning lines (GL). The plurality of linear portions 22 is pulled out to a reflective-portion-31 side along the extending direction (Y direction) of the video lines (DL) from the connecting portion 23 and, at the same time, is arranged at a predetermined interval along the extending direction (X direction) of the scanning lines (GL). That is, the pixel electrode (PIX) of this embodiment adopts the comb-teeth electrode structure in which the plurality of linear portions (21, 22) is contiguously formed with the connecting portion 23.

Here, in this embodiment, although the explanation is made with respect to a case in which the linear portions (21, 22) form a portion of the pixel electrode (PIX), the linear portions (21, 22) may be also referred to as the pixel electrode.

The counter electrode (COM) is formed in a divided manner for every 1 display line, for example. As shown in FIG. 6, the counter electrode (COM) is configured to include a planar portion 25 arranged in the reflective portion 31, a plurality of linear portions 26 arranged in the transmissive portion 30, and a connecting portion 27 contiguously formed with respective one end sides of the plurality of linear portions 26. The planar portion 25 is formed so as to cover a whole region of the reflective portion 31. The plurality of linear portions 26 extends along the extending direction (Y direction) of the video lines (DL) and are arranged at a predetermined interval along the extending direction (X direction) of the scanning lines (GL). The plurality of linear portions 26 includes linear portions 26a which have the other-end sides thereof contiguously formed with the planar portion 25 and linear portions 26b which have the other-end sides thereof separated from the planar portion 25, and these linear portions 26a, 26b are alternately arranged along the extending direction of the scanning lines (GL). The counter electrode (COM) having such structure is formed by forming slits in portions thereof corresponding to the transmissive portions 30.

However, the above-mentioned counter electrode (COM) is described merely as an example, and the counter electrode (COM) in the transmissive portion 30 may be formed in any shape provided that the counter electrode (COM) is formed in a shape that the pixel electrode PIX (21) and a peripheral portion of the pixel electrode PIX (21) are removed (shape having the linear portions 26). For example, it may be possible to adopt the structure which includes two or more linear portions 26b between two neighboring linear portions 26a or a shape in which the linear portions 26b are connected to the planar portion 25 thus forming the whole counter electrode (COM) into the linear portions 26a (or a shape which further removes a connecting portion 27).

Here, in FIG. 6, although the counter electrode (COM) is divided in every display line, it is not necessary to be divided and the counter electrode (COM) may be connected to each other at all display lines. In this case, the counter electrode (COM) may be formed at whole area except for the transmissive portion 30 where a slit may be formed.

Here, in this embodiment, although the explanation is made with respect to a case in which the linear portions 26 form a portion of the counter electrode (COM), the linear portions 26 may be also referred to as the counter electrode.

As shown in FIG. 3 and FIG. 5, the insulation film (PAS3) is formed in the reflective portion 31, and the counter electrode (COM) and the pixel electrode (PIX) are stacked by way of the insulation film (PAS3) on a glass-substrate (SUB1) side. In this embodiment, the pixel electrode (PIX) is formed over the counter electrode (COM).

On the other hand, in the transmissive portion 30, as shown in FIG. 3 and FIG. 4, the insulation film (PAS3) is removed, and the counter electrode (COM) and the pixel electrode (PIX) are arranged to face each other in the planar direction, that is, the counter electrode (COM) and the pixel electrode (PIX) are formed on the same layer. In this embodiment, as shown in FIG. 1 and FIG. 4, the linear portions 26 of the counter electrode (COM) and the linear portions 21 of the pixel electrode (PIX) are alternately arranged along the extending direction (X direction) of the scanning lines (GL). That is, these linear portions 26, 21 are alternately arranged close to each other.

That is, the counter electrode (COM) and the pixel electrode (PIX) in the reflective portion 31 are stacked by way of the insulation film (PAS3), while the counter electrode (COM) and the pixel electrode (PIX) in the transmissive portion 30 are arranged to face each other in the planar direction. Such structure can be obtained by selectively removing the insulation film (PAS3) in the transmissive portion 30, that is, by selectively obviating the formation of the insulation film (PAS3).

In the reflective portion 31, the pixel electrode (PIX) and the counter electrode (COM) overlap with each other by way of the insulation film (PAS3) thus forming a holding capacitance. The pixel electrode (PIX) and the counter electrode (COM) are formed of a transparent conductive film made of ITO (Indium Tin Oxide) or the like, for example.

In the IPS-type transflective liquid crystal display device of this embodiment, the pixel electrode (PIX) and the counter electrode (COM) in the reflective portion 31 are stacked by way of the insulation film (PAS3), and the pixel electrode (PIX) and the counter electrode (COM) in the transmissive portion 30 are arranged to face each other in the planar direction and hence, arcuate lines of electric force which are generated between the pixel electrode (PIX) and the counter electrode (COM) are distributed such that these lines of electric force penetrate the liquid crystal layer (LC) thus changing the orientation of liquid crystal of the liquid crystal layer (LC).

A pitch of the sub pixels (also referred to as pixel pitch or pitch of video lines (DL)) is 51 µm. The sub pixel has two pixel electrodes (PIX) (linear portions 21) in the transmissive portion 30, and has three counter electrodes (COM) (linear portions 26) in total in the transmissive portion 30 including two counter electrodes (COM) at pixel ends. The reflective portion 31 has six pixel electrodes (PIX) (linear portions 22).

The cell gap length in the reflective portion 31 is set approximately half of the cell gap length in the transmissive portion 30. This is because light passes the reflective portion 31 twice in outgoing and incoming paths thereof and hence, it is necessary to make the optical path length of the transmissive portion 30 and the optical path length of the reflective portion 31 substantially equal to each other. While the transmissive portion 30 displays contrast of light by making use of birefringence of the liquid crystal layer (LC), the reflective portion 31 displays contrast of light by making use of birefringence of the phase difference plate (RET) and birefringence of the liquid crystal layer (LC).

Here, in FIG. 1 and FIG. 6, symbol EL indicates a terminal portion of the insulation film (PAS3), and symbol CH indicates a contact hole formed in the insulation films (PAS1, PAS2).

Here, an IPS-type transflective liquid crystal display device which constitutes a comparison example is explained.

Figure 8:
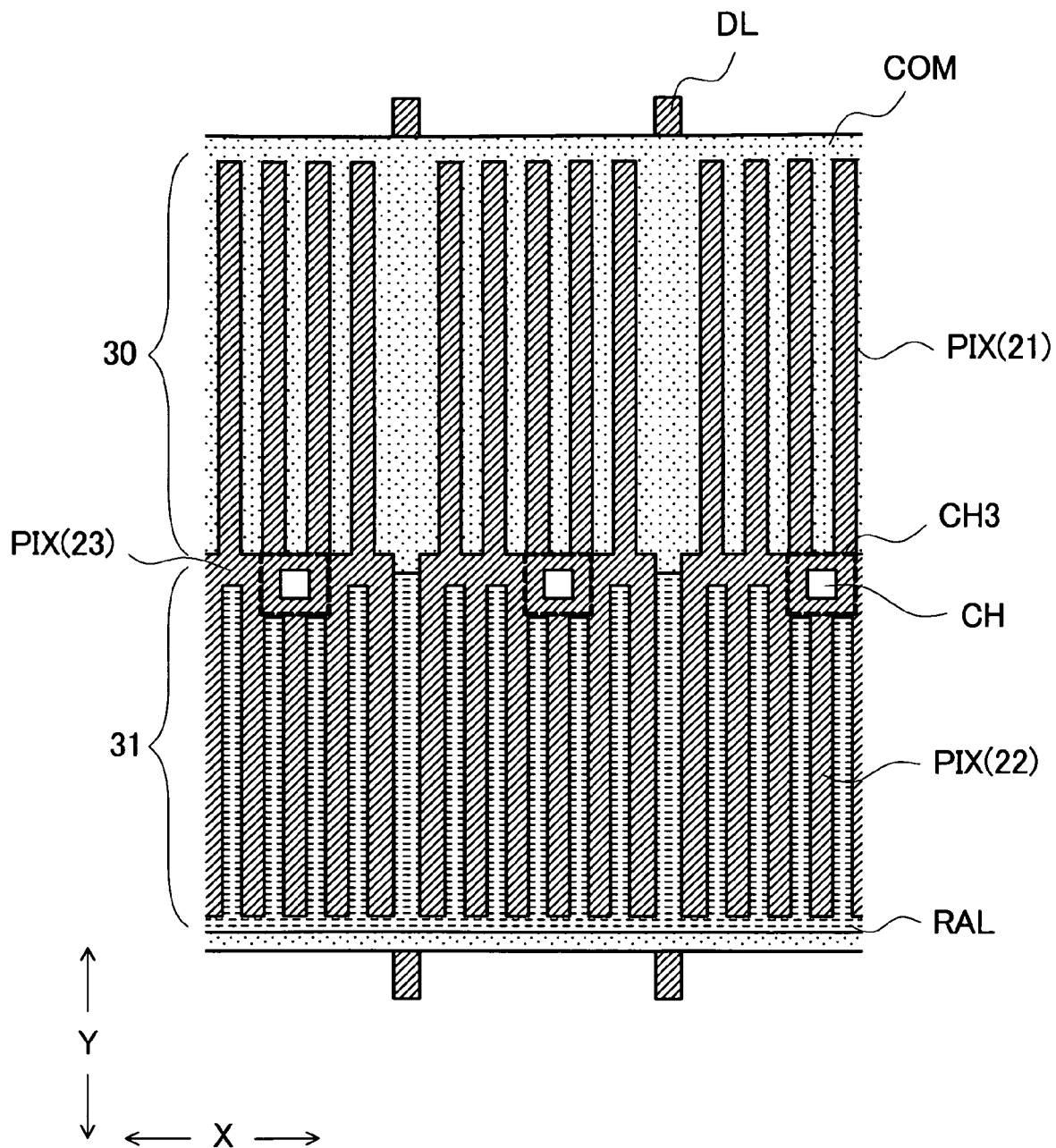
FIG. 8 is a plan view showing the electrode structure of one sub pixel and portions of two sub pixels adjacent to one sub pixel on a TFT substrate side in the IPS-type transflective liquid crystal display device which constitutes the comparison example.
Figure 9:
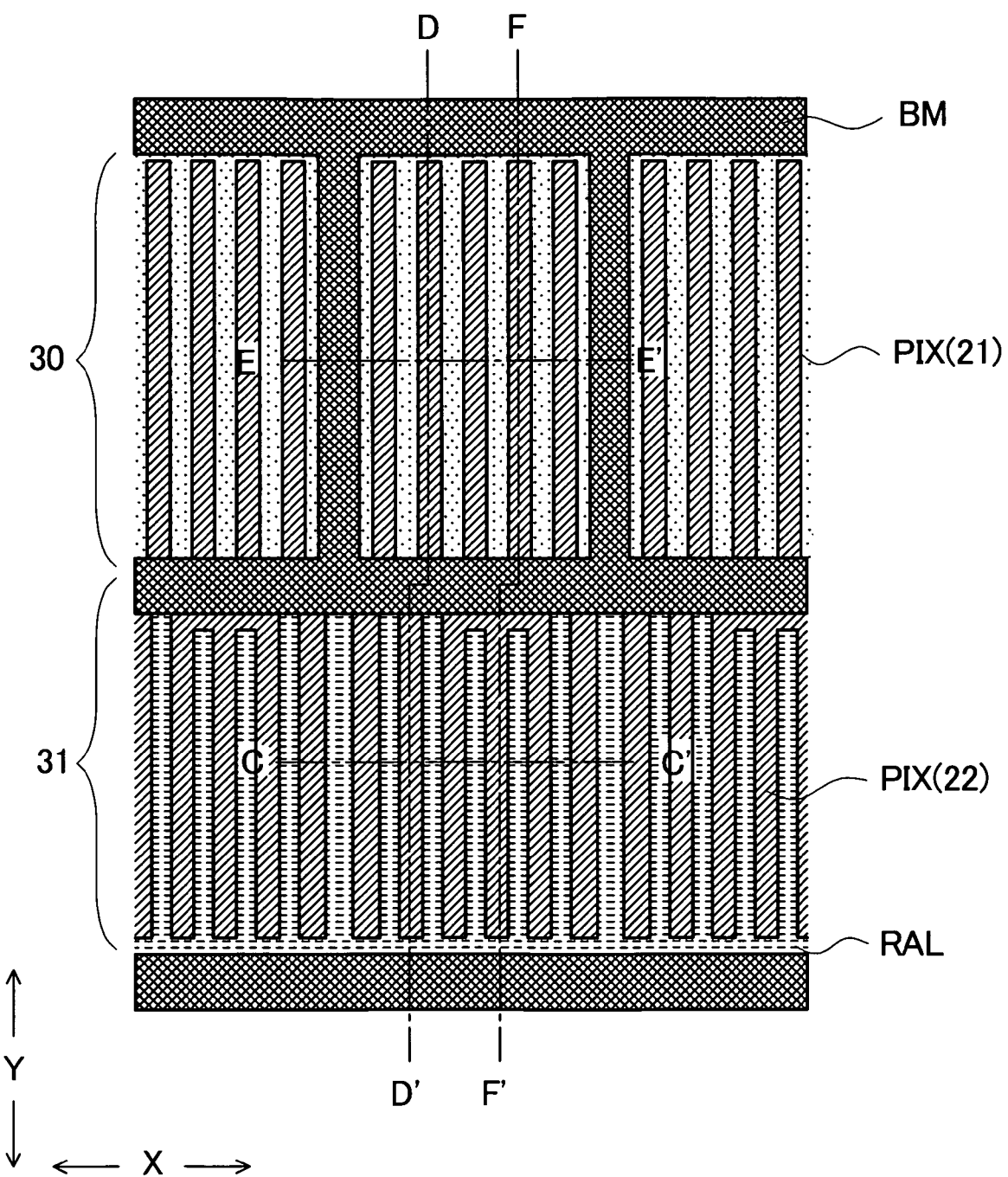
FIG. 9 is a plan view showing a state that a CF substrate overlaps with the TFT substrate shown in FIG. 8.
Figure 10:
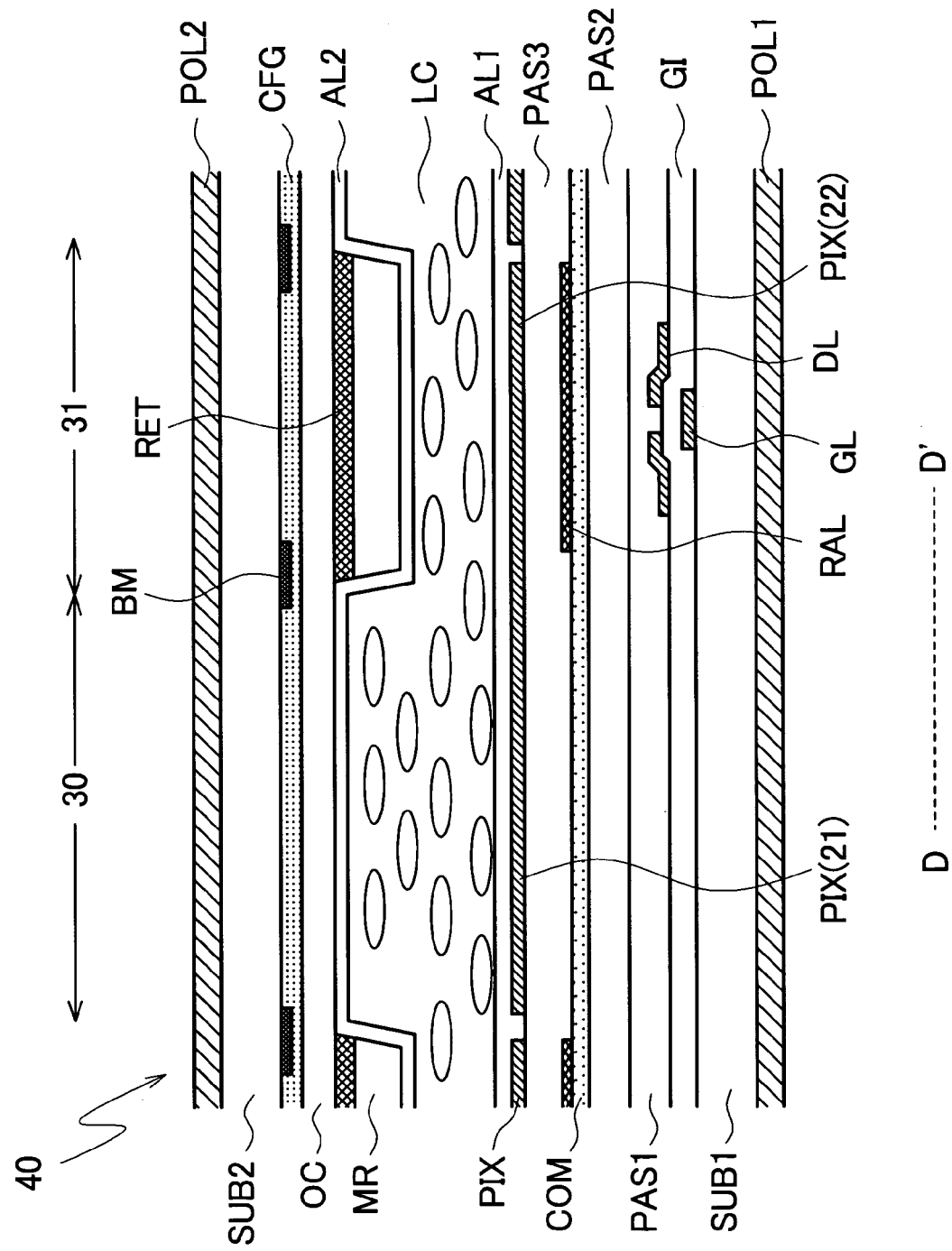
FIG. 10 is a cross-sectional view showing the cross-sectional structure taken along a line D-D' in FIG. 9.
Figure 11:
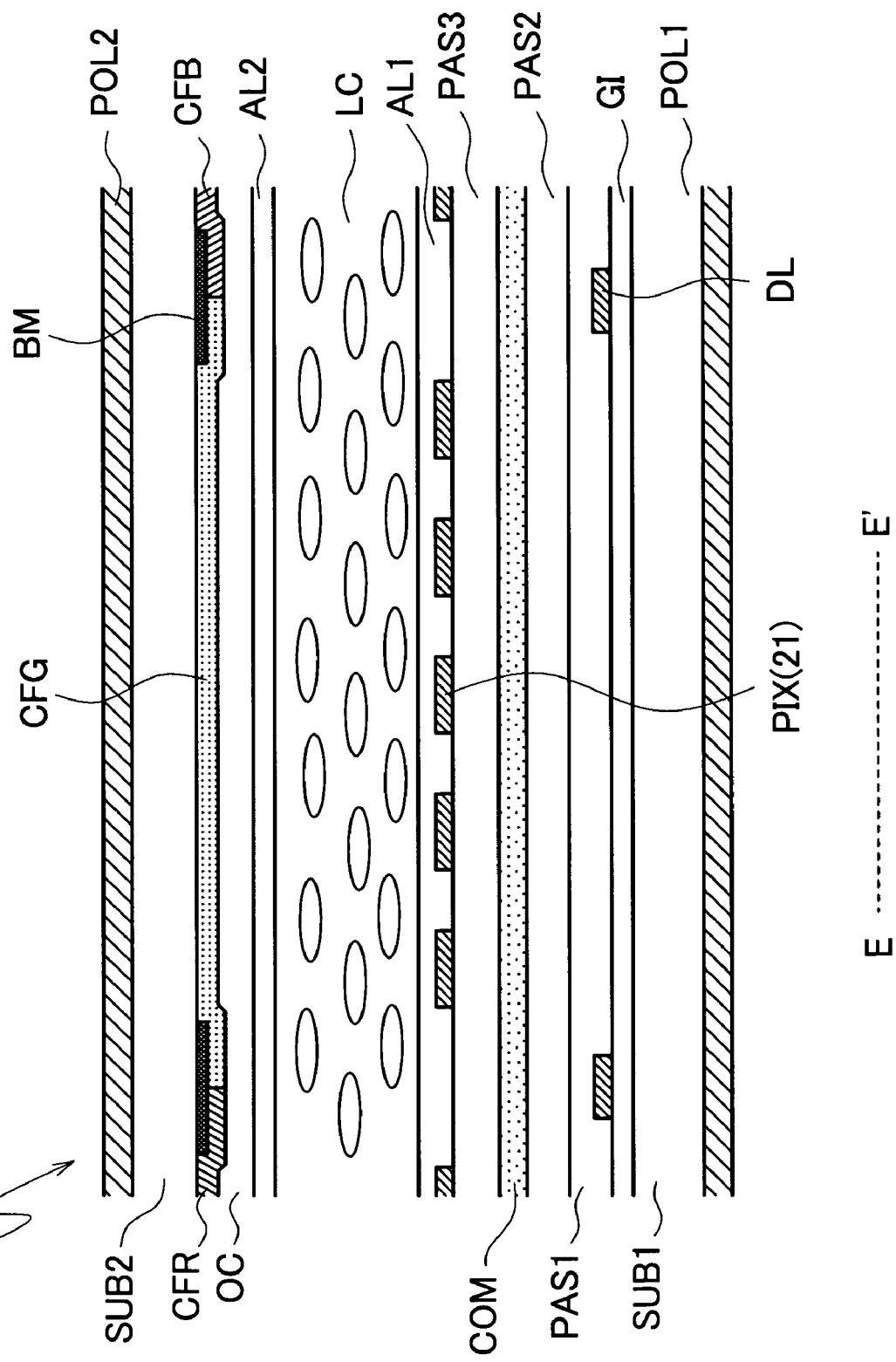
FIG. 11 is a cross-sectional view showing the cross-sectional structure taken along a line E-E' in FIG. 9.
Figure 12:
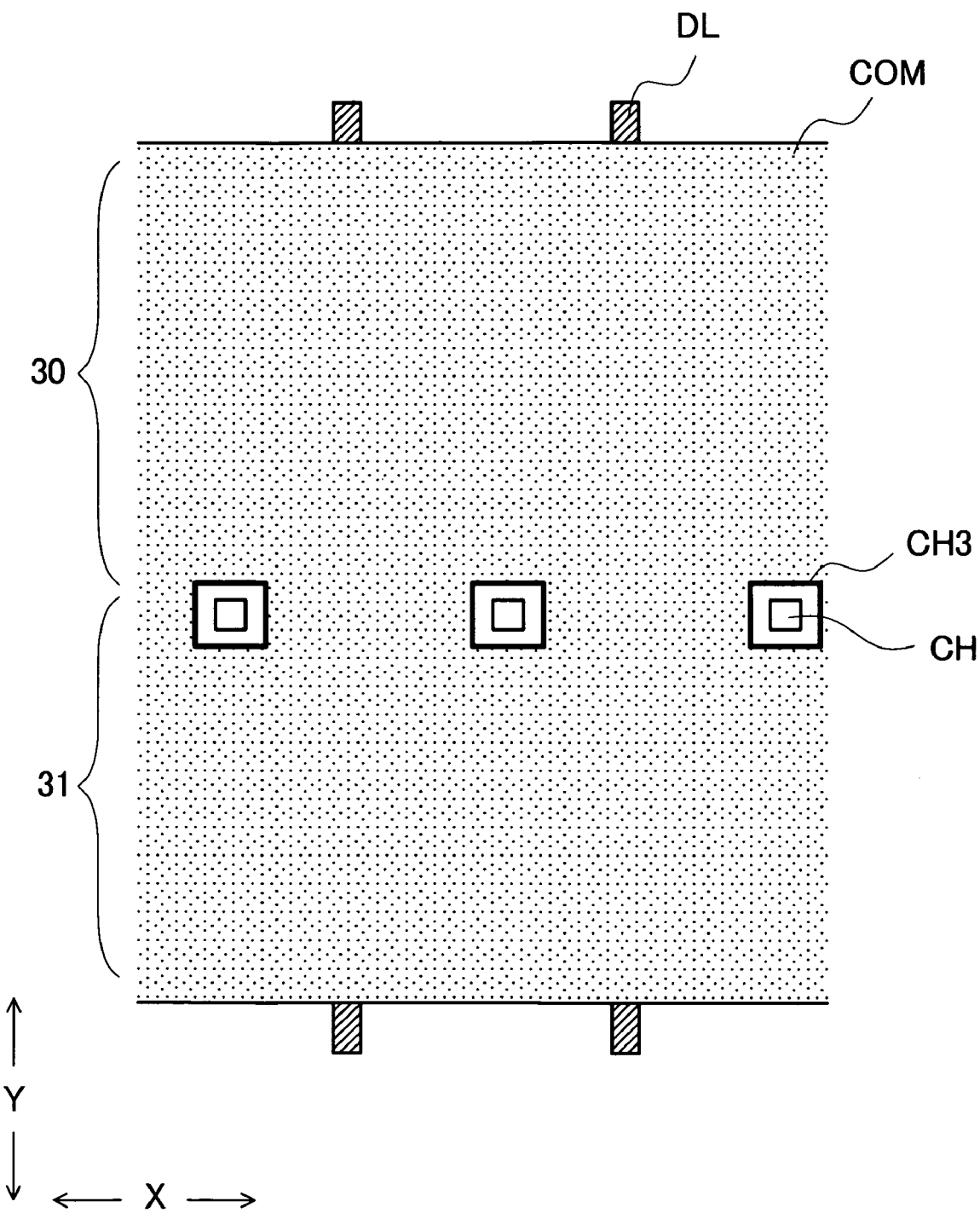
FIG. 12 is a plan view showing the relationship between a counter electrode and an insulation film of the comparison example.
Figure 13:
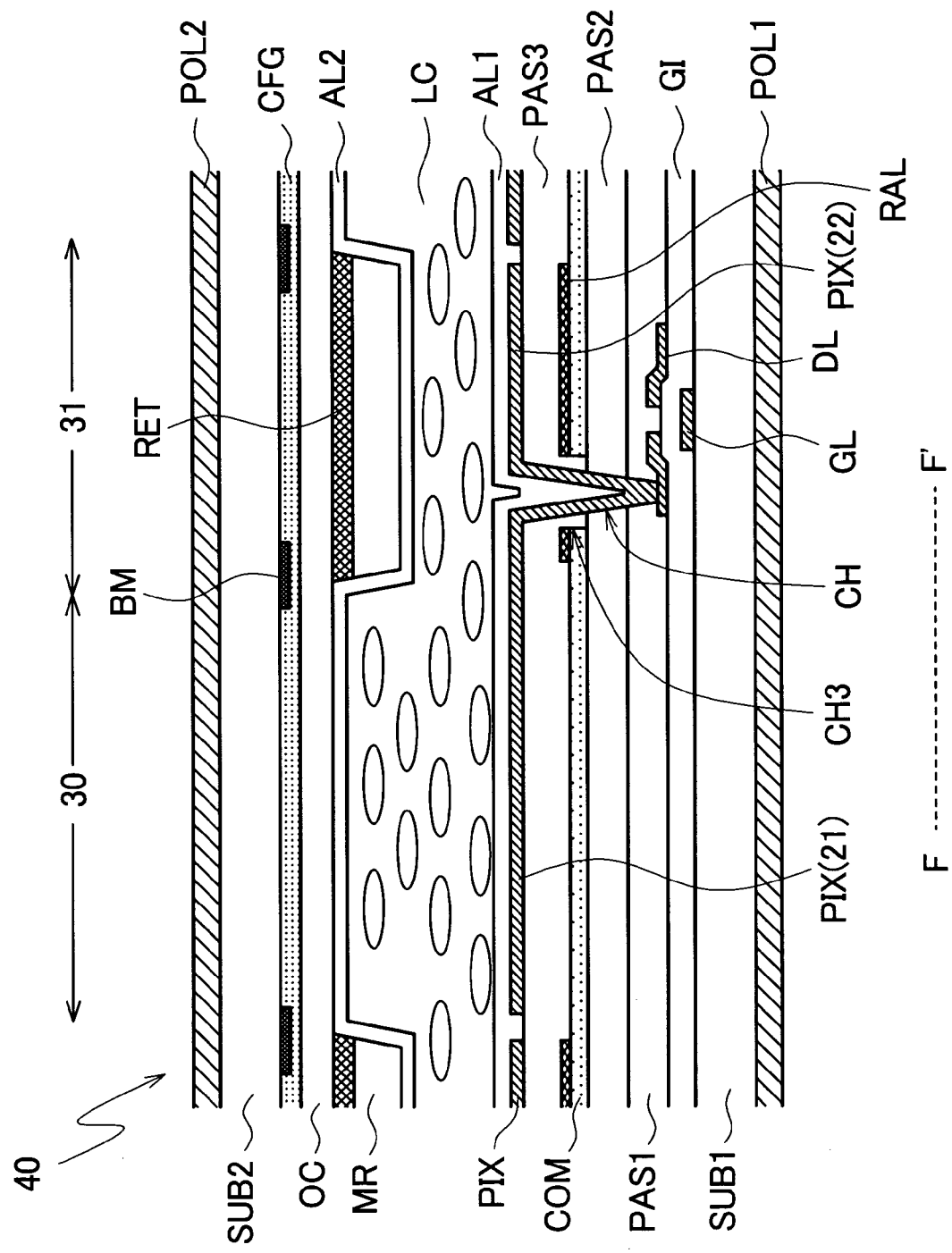
FIG. 13 is a cross-sectional view showing the cross-sectional structure taken along a line F-F' in FIG. 9.
Figure 14:
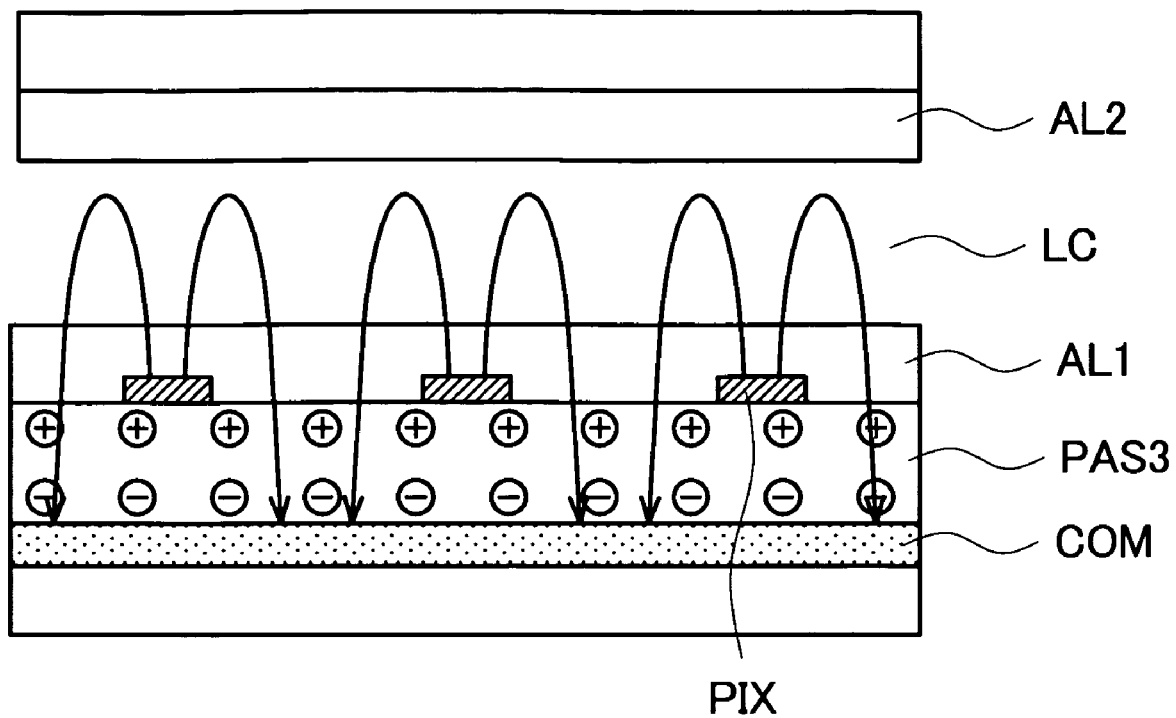
FIG. 14 is a schematic view for explaining a drawback in a transmissive portion in the IPS-type transflective liquid crystal display device of a comparison example.

FIG. 8 is a plan view showing the electrode structure of one sub pixel and portions of two sub pixels adjacent to one sub pixel on a TFT substrate side in the IPS-type transflective liquid crystal display device which constitutes the comparison example, FIG. 9 is a plan view showing a state that a CF substrate overlaps with the TFT substrate shown in FIG. 8, FIG. 10 is a cross-sectional view showing the cross-sectional structure taken along a line D-D' in FIG. 9, FIG. 11 is a cross-sectional view showing the cross-sectional structure taken along a line E-E' in FIG. 9, FIG. 12 is a plan view showing the relationship between a counter electrode and an insulation film of the liquid crystal display device which constitutes the comparison example, FIG. 13 is across-sectional view showing the cross-sectional structure taken along a line F-F' in FIG. 9, and FIG. 14 is a schematic view for explaining a drawback that a transmissive portion has in the IPS-type transflective liquid crystal display device which constitutes the comparison example.

Here, the cross-sectional view taken along a line C-C' in FIG. 9 is substantially equal to the cross-sectional view shown in FIG. 5.

On a glass-substrate-(SUB1) side, a comb-teeth-shaped pixel electrode (PIX) and a planar counter electrode (COM) are stacked by way of an insulation film (PAS3), and arcuate lines of electric force which are generated between the pixel electrode (PIX) and the counter electrode (COM) are distributed such that these lines of electric force penetrate the liquid crystal layer (LC) thus changing the orientation of liquid crystal of the liquid crystal layer (LC) whereby the liquid crystal display device can perform a transmissive display and a reflective display.

A pitch of sub pixels (also referred to as pixel pitch or pitch of video lines (DL)) is 51 µm. The sub pixel has five pixel electrodes (PIX) (linear portions 21) in the transmissive portion 30, and an electrode pitch of the pixel electrodes (PIX) (linear portions 21) is 8.5 µm. Although the number of pixel electrodes (PIX) (linear portions 22) in the reflective portion 31 may be equal to the number of pixel electrodes (PIX) (linear portions 21) in the transmissive portion 30, in the comparison example introduced here, the number of pixel electrodes (PIX) (linear portions 22) is set to 6.

A cell gap length in the reflective portion 31 is set approximately half of a cell gap length in the transmissive portion 30. This is because light passes the reflective portion 31 twice in outgoing and incoming paths thereof and hence, it is necessary to make the optical path length of the transmissive portion 30 and the optical path length of the reflective portion 31 substantially equal to each other. While the transmissive portion 30 displays contrast of light by making use of birefringence of the liquid crystal layer (LC), the reflective portion 31 displays contrast of light by making use of birefringence of a phase difference plate (RET) and birefringence of the liquid crystal layer (LC).

In FIG. 8, FIG. 12 and FIG. 13, symbol CH3 indicates a contact hole formed in the counter electrode (COM).

This conventional example adopts the structure which sandwiches the insulation film (PAS3) between the pixel electrode (PIX) and the counter electrode (COM) and hence, when the liquid crystal is driven for a long time, there arises a drawback that a charge is stored in the insulation film (PAS3) as shown in FIG. 14. An electric field generated by the stored charge influences liquid crystal molecules and hence, an electric field which the liquid crystal molecules receive becomes stronger or weaker than a desired electric field, and such a phenomenon appears as a change of transmissivity or reflectance. This change is referred to as image retention or sticking, in general, and is a display defect which should never occur in the liquid crystal display. That is, the change causes the deterioration of display quality. Although such a drawback may arise irrespective of whether the interlayer insulation film is an organic insulation film or an inorganic insulation film, this drawback becomes particularly more conspicuous when the interlayer insulation film is formed of the organic insulation film.

To further explain the above-mentioned drawback, in the IPS-type transflective liquid crystal display device which constitutes the comparison example, in both of a transmissive portion 30 and a reflective portion 31, on a counter electrode (COM) which is arranged on a whole surface of each portion 30, 31, the comb-teeth-shaped pixel electrode (PIX) is arranged by way of the insulation film (PAS3). In a turn-on state, lines of electric force penetrate the insulation film (PAS3) and hence, there arises a drawback that a DC voltage component remains in the insulation film (PAS3) due to localization of charge caused by orientational polarization. This DC voltage component is superposed on a drive voltage and hence, an effective value of the drive voltage is increased thus giving rise to a drawback that the brightness is locally increased. For example, when an intermediate gradation display is performed after displaying a white image for a long time, a portion of the white image remains as image retention.

However, the higher a contrast ratio of display, more easily the image retention is liable to be observed and hence, in the transflective liquid crystal panel, the image retention is observed in the transmissive portion and the image retention is not observed in the reflective portion. This is because, in general, the transmissive portion exhibits the high contrast ratio of 200:1 or more, while the reflective portion exhibits a low contrast ratio of 50:1 or less. Accordingly, it is sufficient for the transflective liquid crystal display panel to cope with the image retention of only the transmissive portion.

Accordingly, in one sub pixel of this embodiment 1, as shown in FIG. 1 to FIG. 5, the reflective portion 31 adopts the structure (type B) in which the counter electrode and the pixel electrode (PIX) are stacked by way of the insulation film (PAS3), while the transmissive portion 30 adopts the structure (type A) in which the counter electrode (COM) and the pixel electrode (PIX) are arranged to face each other in the planar direction (arranged on the same layer in the planar direction).

Due to such structure, the insulation film (PAS3) or the like is not sandwiched between the counter electrode (COM) and pixel electrode (PIX) in the transmissive portion 30 and hence, a drawback that "a charge is stored in the insulation film (PAS3) when the liquid crystal is continuously driven for a long time and hence, the image retention occurs" no more arises. Further, the transmissive portion 30 can ensure a large liquid crystal layer thickness and hence, even when the transmissive portion 30 does not adopt the structure (type B) in which the counter electrode (COM), and the pixel electrode (PIX) are stacked by way of the insulation film (PAS3) as in the case of the reflective portion 31, the transmissive portion 30 can maintain the high transmissivity.

On the other hand, the reflective portion 31 has a small liquid crystal layer thickness and hence, to obtain the high reflectance, the reflective portion 31 is required to adopt the structure (type B) in which the counter electrode and the pixel electrode (PIX) are stacked by way of the insulation film (PAS3). However, the reflective portion 31 of 1 sub pixel described in this embodiment adopts the same structure as the convention type B and hence, the reflective portion 31 can obtain a reflection display of high reflectance.

As a result, it is possible to enhance display quality in the IPS-type transflective liquid crystal display device.

In this embodiment 1, the insulation film (PAS3) may be formed of either an organic insulation film or an inorganic insulation film. In the comparison example, the organic insulation film exhibits a larger image retention drawback and hence, the liquid crystal display device having the organic insulation film (PAS3) can obtain a larger image suppression effect by removing the insulation film (PAS3) compared to the liquid crystal display device having the inorganic insulation film (PAS3).

Here, in the embodiment 1, patterning of the counter electrode (COM) and the insulation film (PAS3) becomes necessary. However, the counter electrode (COM) and the insulation film (PAS3) are formed by patterning at the time of forming a contact hole also in the comparison example and hence, it is possible to acquire the structure of the embodiment 1 by merely changing a mask without increasing a manufacturing process compared to the comparison example.

Embodiment 2

Figure 7:
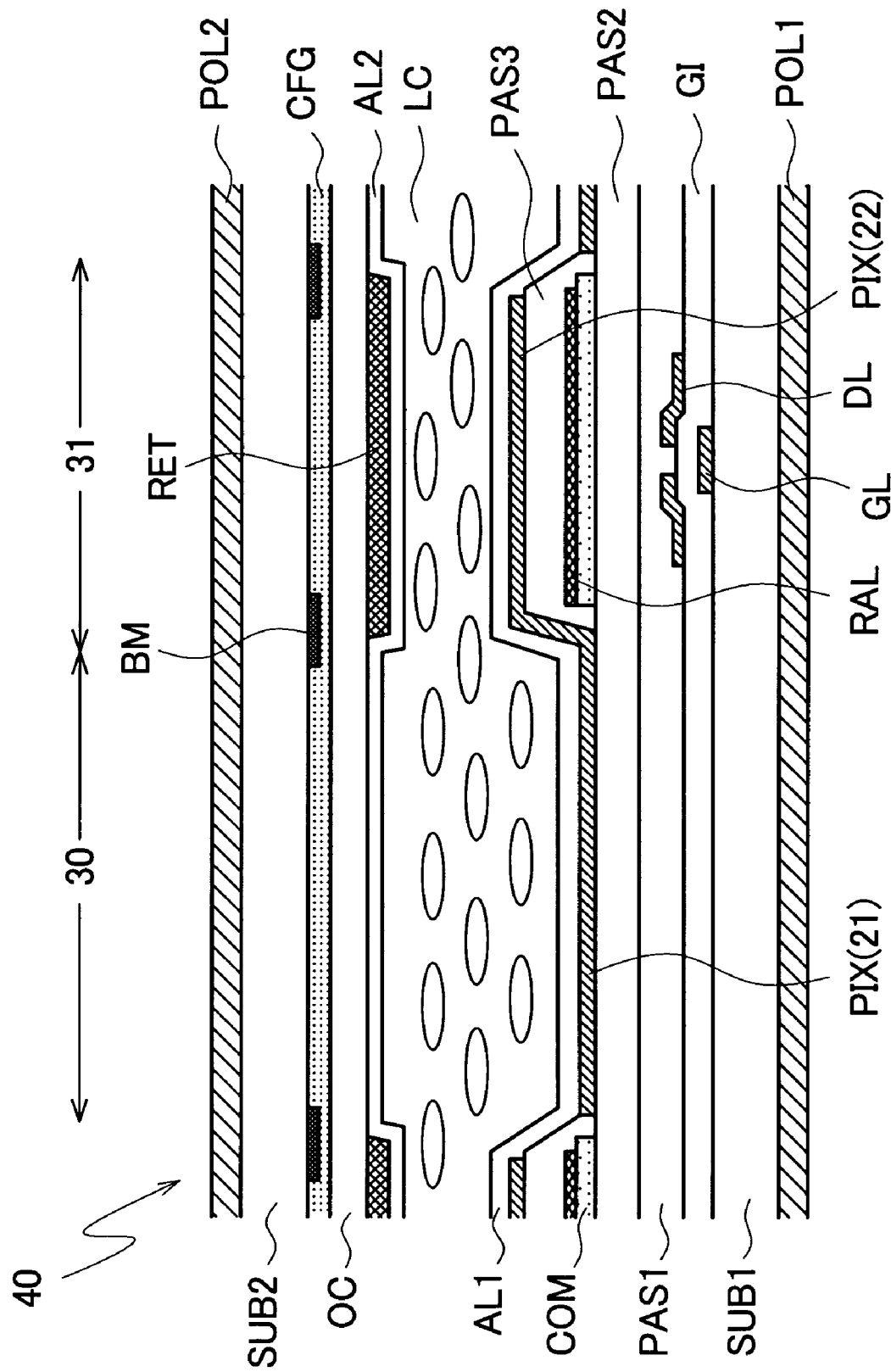
FIG. 7 is a cross-sectional view showing a schematic constitution of the IPS-type transflective liquid crystal display device as an embodiment 2 according to the present invention.

FIG. 7 is a cross-sectional view showing the schematic constitution of an IPS-type transflective liquid crystal display device which constitutes an embodiment 2 of the present invention. FIG. 7 corresponds to FIG. 3 showing the embodiment 1.

The difference between the embodiment 2 and the embodiment 1 lies in the presence or the absence of a step forming layer (MR). In this embodiment 2, the step forming layer (MR) is not formed on a glass-substrate (SUB2) side. The step forming layer (MR) is formed for making an optical path length of a liquid crystal layer (LC) in a transmissive portion 30 and an optical pathlength of a liquid crystal layer (LC) in a reflective portion 31 substantially equal to each other by forming a step between the transmissive portion 30 and the reflective portion 31.

However, in the structure of this embodiment, an insulation film (PAS3) of the transmissive portion 30 is removed and hence, a step is formed between the transmissive portion 30 and the reflective portion 31. Accordingly, even when a step forming layer (MR) is not formed in the reflective portion 31 on a glass-substrate-(SUB2) side, it is possible to make the optical path length of the liquid crystal layer (LC) in the transmissive portion 30 and the optical path length of the liquid crystal layer (LC) in the reflective portion 31 equal to each other. Due to such structure, it is no more necessary to form the step forming layer (MR) on the glass substrate (SUB2) side and hence, a manufacturing process can be simplified.

Although the invention made by inventors of the present invention has been specifically explained in conjunction with the embodiments, it is needless to say that the present invention is not limited to the above-mentioned embodiments and various modifications are conceivable without departing from the gist of the present invention.

For example, in the above-mentioned embodiments 1 and 2, the explanation has been made with respect to the case which adopts, as the structure of the reflective portion 31, the structure in which the pixel electrode (PIX) is arranged above the counter electrode (COM) on a TFT-substrate-(SUB1) side. However, the present invention is also applicable to the liquid crystal display device which adopts, as the structure of the reflective portion 31, the structure in which the counter electrode (COM) is arranged above the pixel electrode (PIX) on the TFT-substrate-(SUB1) side.

In this case, the counter electrode (COM) is, for example, in the same manner as the pixel electrode (PIX) in the embodiment 1, formed in a shape which includes a plurality of linear portions in the transmissive portion 30 and the reflective portion 31.

On the other hand, the pixel electrode (PIX) is, for example, in the same manner as the counter electrode (COM) in the embodiment 1, formed in a shape which includes a planar portion arranged in the reflective portion 31 and a plurality of linear portions arranged in the transmissive portion 30. A reflective electrode (RAL) is arranged on the pixel electrode (PIX) in the reflective portion 31. Further, in the embodiments 1 and 2, the number of the pixel electrodes (PIX) and the number of the linear portions of the counter electrode (COM) within one sub pixel may be one, two or more respectively.

What is claimed is:

1. A transflective liquid crystal display device including a liquid crystal display panel having a pair of substrates and a liquid crystal layer sandwiched between the pair of substrates, the liquid crystal display panel including a plurality of sub pixels each of which has a transmissive portion and a reflective portion, each sub pixel out of the plurality of sub pixels having a counter electrode formed on one substrate out of the pair of substrates and a pixel electrode formed on one substrate, the counter electrode and the pixel electrode generating an electric field for driving liquid crystal of the liquid crystal layer, wherein the counter electrode and the pixel electrode in the reflective portion are stacked by way of an insulation film, and the counter electrode and the pixel electrode in the transmissive portion face each other in a planer direction.

2. A transflective liquid crystal display device according to claim 1, wherein the counter electrode and the pixel electrode in the transmissive portion are formed on the same layer.

3. A transflective liquid crystal display device according to claim 1, wherein the insulation film is not provided to the transmissive portion.

4. A transflective liquid crystal display device according to claim 1, wherein the counter electrode in the reflective portion is formed of a plane electrode, the counter electrode in the transmissive portion is formed of an electrode having a plurality of linear portions, the pixel electrode in the reflective portion and the pixel electrode in the transmissive portion are formed of an electrode having a plurality of linear portions, and the pixel electrode in the reflective portion is formed above the counter electrode in the reflective portion.

5. A transflective liquid crystal display device according to claim 4, wherein a reflective electrode is formed over the counter electrode in the reflective portion.

6. A transflective liquid crystal display device according to claim 4, wherein the linear portions of the pixel electrode and the linear portions of the counter electrode in the transmissive portion are alternately arranged close to each other.

7. A transflective liquid crystal display device according to claim 1, wherein the pixel electrode in the reflective portion is formed of a plane electrode, the pixel electrode in the transmissive portion is formed of an electrode having a plurality of linear portions, the counter electrode in the reflective portion and the counter electrode in the transmissive portion are formed of an electrode having a plurality of linear portions, and the counter electrode in the reflective portion is formed above the pixel electrode in the reflective portion.

8. A transflective liquid crystal display device according to claim 7, wherein a reflective electrode is formed over the pixel electrode in the reflective portion.

9. A transflective liquid crystal display device according to claim 7, wherein the linear portions of the pixel electrode and the linear portions of the counter electrode in the transmissive portion are alternately arranged close to each other.

10. A transflective liquid crystal display device according to claim 1, wherein a phase difference plate and a step forming layer are formed on the reflective portion of another substrate out of the pair of substrates.

11. A transflective liquid crystal display device according to claim 1, wherein a phase difference plate is formed and a step forming layer is not formed on the reflective portion of another substrate out of the pair of substrates.

12. A transflective liquid crystal display device according to claim 1, wherein the insulation film is an organic insulation film.

13. A transflective liquid crystal display device according to claim 1, wherein the insulation film is an inorganic insulation film.

* * * * *